United States Patent
Lhomme et al.

(10) Patent No.: US 7,490,898 B2
(45) Date of Patent: Feb. 17, 2009

(54) CHILD RESTRAINT WITH SWIVELING JUVENILE SEAT AND SWIVEL-STATUS INDICATOR

(75) Inventors: Gilles Lhomme, Chateau D'Olonne (FR); Richard Biaud, Trementines (FR)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/848,928

(22) Filed: Aug. 31, 2007

(65) Prior Publication Data

US 2008/0054694 A1    Mar. 6, 2008

Related U.S. Application Data

(63) Continuation-in-part of application No. 11/766,066, filed on Jun. 20, 2007, and a continuation-in-part of application No. 11/766,071, filed on Jun. 20, 2007.

(60) Provisional application No. 60/953,110, filed on Jul. 31, 2007.

(30) Foreign Application Priority Data

Sep. 1, 2006 (FR) .................................... 06 07696
Sep. 1, 2006 (FR) .................................... 06 07707

(51) Int. Cl.
    *A47D 1/10*    (2006.01)
(52) U.S. Cl. .............................. 297/256.12; 297/256.16
(58) Field of Classification Search ............ 297/256.12, 297/256.16
    See application file for complete search history.

(56) References Cited

U.S. PATENT DOCUMENTS

| | | | | |
|---|---|---|---|---|
| 4,634,177 A | * | 1/1987 | Meeker .................. | 297/256.16 |
| 4,936,629 A | * | 6/1990 | Young .................... | 297/256.12 |
| 4,971,392 A | * | 11/1990 | Young .................... | 297/256.12 |
| 5,468,014 A | * | 11/1995 | Gimbel et al. ...... | 297/256.12 X |
| 6,070,890 A | * | 6/2000 | Haut et al. .......... | 297/256.16 X |
| 6,139,101 A | * | 10/2000 | Berringer et al. .... | 297/256.16 X |
| 6,299,249 B1 | * | 10/2001 | Mori ..................... | 297/256.13 |
| 6,318,799 B1 | * | 11/2001 | Greger et al. .......... | 297/256.13 |
| 6,322,142 B1 | * | 11/2001 | Yoshida et al. ...... | 297/256.16 X |
| 6,331,032 B1 | * | 12/2001 | Haut et al. .......... | 297/256.16 X |
| 6,454,350 B1 | * | 9/2002 | Celestina-Krevh et al. .................. | 297/256.16 X |
| 6,705,676 B1 | * | 3/2004 | Berringer et al. .... | 297/256.16 X |
| 6,773,065 B1 | | 8/2004 | Stamper | |
| 6,863,286 B2 | * | 3/2005 | Eros et al. ........... | 297/256.16 X |
| 7,040,694 B2 | * | 5/2006 | Sedlack .............. | 297/256.16 X |
| 7,338,122 B2 | * | 3/2008 | Hei et al. ............... | 297/256.12 |

(Continued)

FOREIGN PATENT DOCUMENTS

EP    1110807    6/2001

(Continued)

OTHER PUBLICATIONS

International Search Report dated Apr. 5, 2007, French Application No. 0607707.

*Primary Examiner*—Rodney B. White
(74) *Attorney, Agent, or Firm*—Barnes & Thornburg LLP

(57) ABSTRACT

A child restraint includes a base and a swiveling juvenile seat on the base. The child restraint is adapted to be anchored to a vehicle seat to transport a child in a vehicle.

23 Claims, 10 Drawing Sheets

U.S. PATENT DOCUMENTS

| | | | |
|---|---|---|---|
| 7,357,451 B2 | 4/2008 | Bendure et al. | |
| 2004/0207243 A1* | 10/2004 | Sedlack | 297/256.16 |
| 2005/0275260 A1* | 12/2005 | Patterson et al. | 297/256.16 |
| 2006/0049677 A1* | 3/2006 | Lawrence et al. | 297/256.16 |
| 2007/0296254 A1* | 12/2007 | Kahn | 297/256.16 |

FOREIGN PATENT DOCUMENTS

| | | |
|---|---|---|
| EP | 1247688 | 10/2002 |
| EP | 1625967 | 2/2006 |
| EP | 1625968 | 2/2006 |
| WO | 2005000627 | 1/2005 |

* cited by examiner

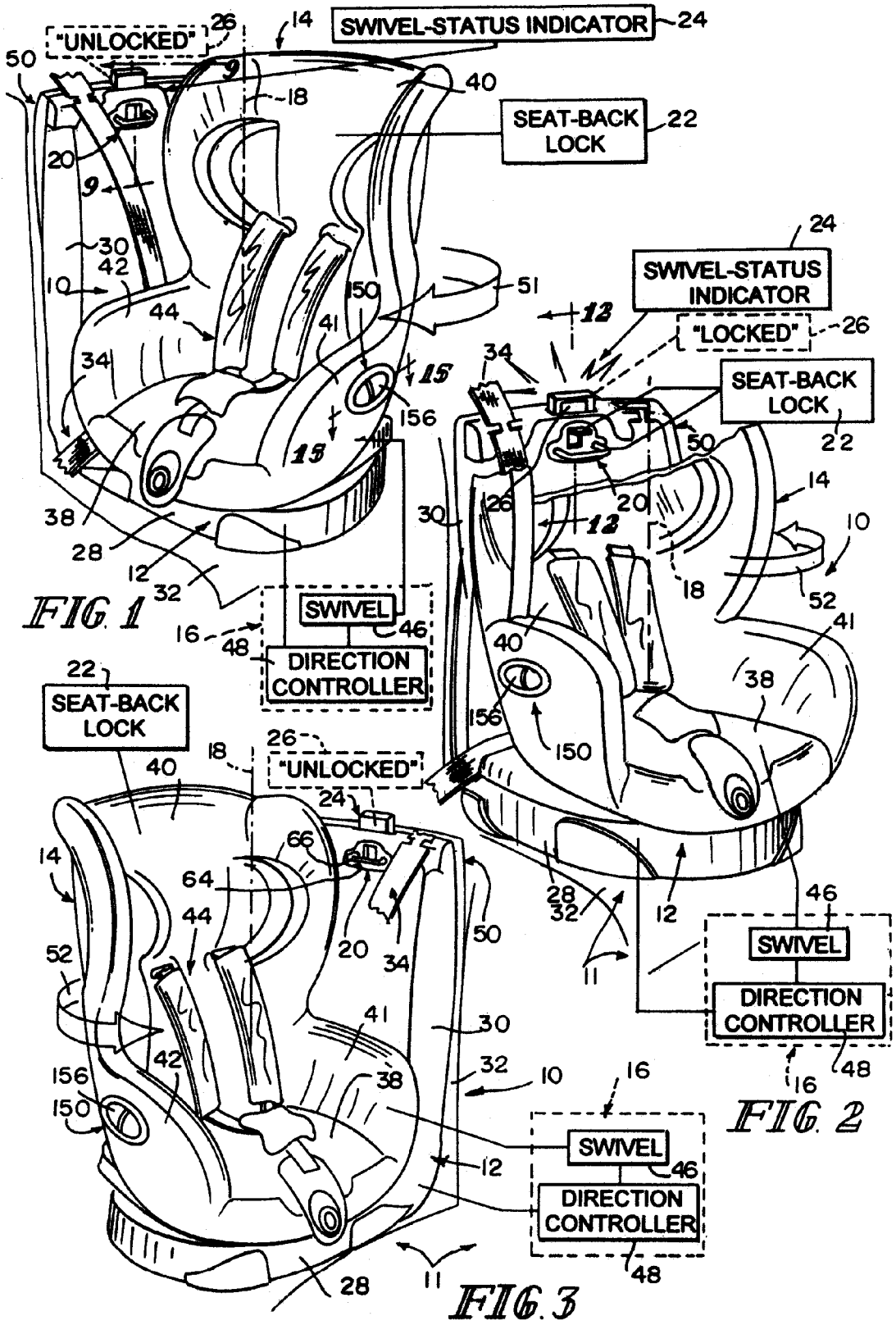

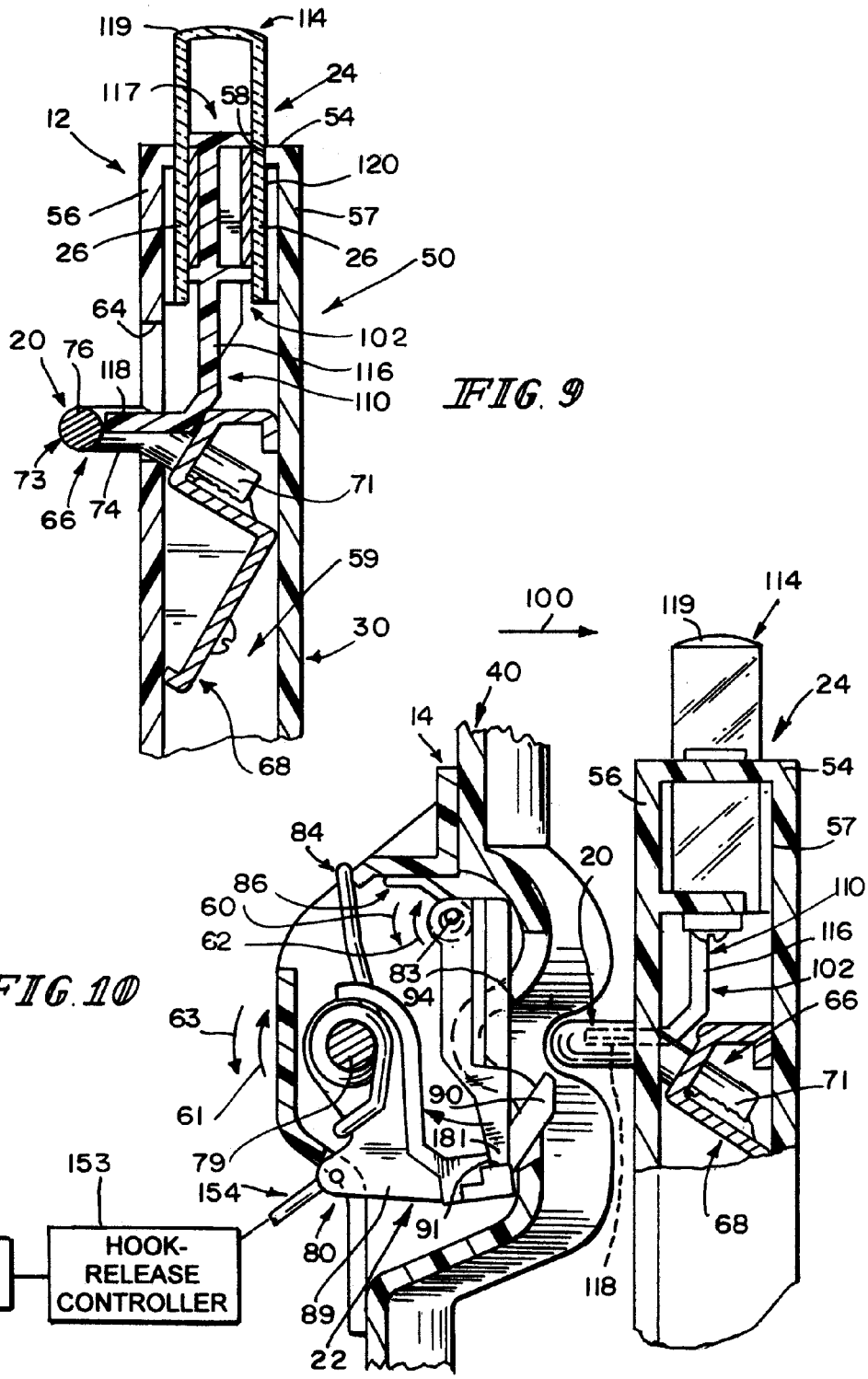

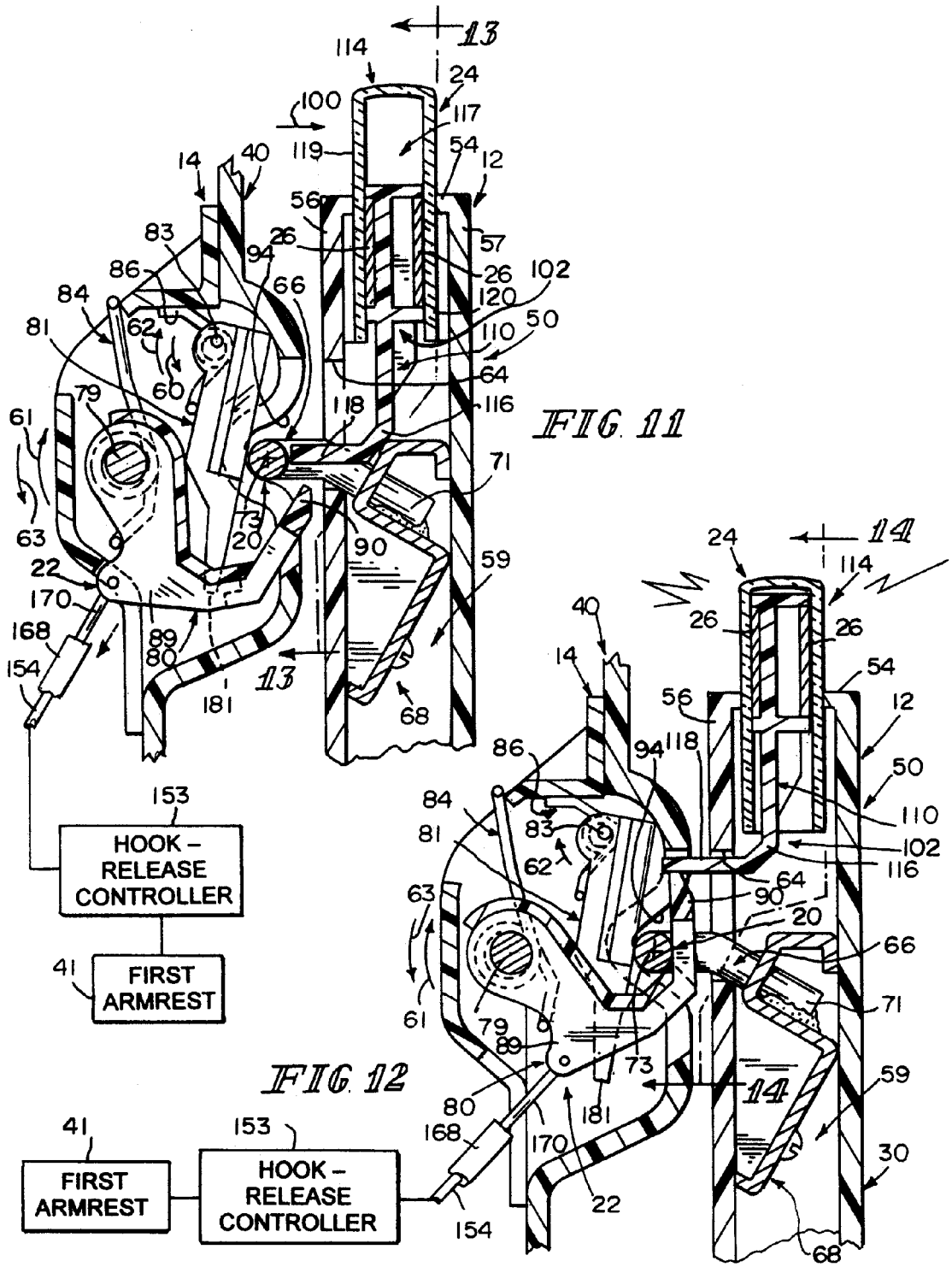

US 7,490,898 B2

CHILD RESTRAINT WITH SWIVELING JUVENILE SEAT AND SWIVEL-STATUS INDICATOR

This application is a continuation-in-part of and claims priority to U.S. application Ser. No. 11/766,066, filed Jun. 20, 2007 (which claims priority to FR Application No. 06/07696, filed Sep. 1, 2006); is a continuation-in-part of and claims priority to U.S. application Ser. No. 11/766,071, filed Jun. 20, 2007 (which claims priority to FR Application No. 06/07707, filed Sep. 1, 2006); and claims priority to U.S. Provisional Application No. 60/953,110, filed Jul. 31, 2007. This application also claims priority to FR Application No. 06/07696, filed Sep. 1, 2006 and to FR Application No. 06/07707, filed Sep. 1, 2006.

BACKGROUND

The present disclosure relates to child restraints, and particularly to child restraints adapted to be anchored to a vehicle seat to transport a child in a vehicle. More particularly, the present disclosure relates to a child restraint including a swiveling juvenile seat.

SUMMARY

According to the present disclosure, a child restraint includes a seat support and a juvenile seat. The seat support includes a base and a swivel coupled to the base. The juvenile seat is mounted on the swivel for swiveling motion relative to the base about an axis of rotation between a "forward-facing" travel position and a "side-facing" entry position. The juvenile seat includes a seat bottom mounted on the swivel and a seat back arranged to extend upwardly from the seat bottom.

In illustrative embodiments, the seat support of the child restraint also includes a swivel-status indicator. The juvenile seat includes a seat-back lock that is carried on the seat back and configured to include a movable hook designed to mate with a stationary seat anchor coupled to the base whenever the juvenile seat is swiveled relative to the base to assume a forward-facing travel position. The swivel-status indicator is coupled to the base and actuated by the hook included in the seat-back lock to notify an observer whenever the juvenile seat is locked to the base in the forward-facing travel position.

In illustrative embodiments, a hook-release controller is coupled to each armrest included in the juvenile seat and configured to operate a companion linkage coupled to the movable hook included in the seat-back lock. A user can use the hook-release controller to disengage the movable hook from the stationary seat anchor coupled to the base whenever the user desires to swivel the juvenile seat relative to the base from the forward-facing travel position to either a "left-facing" or "right-facing" entry position so that a child can be seated easily in the juvenile seat while the base of the child restraint is fixed in a stationary position on a vehicle seat adjacent to one of the passenger doors included in the vehicle.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of an illustrative child restraint including a juvenile seat and a seat support including an "L-shaped" base, a swivel, a swivel direction controller, and a "swivel-status" indicator in accordance with the present disclosure and showing that the base of the child restraint is anchored to an underlying vehicle seat by a lap/shoulder belt system included in a vehicle and showing the juvenile seat after it has been rotated on the swivel about 90° in a "clockwise" direction (represented by a double arrow) about a vertical axis relative to an underlying swivel coupled to the base to lie in a "left-facing" entry position relative to the vehicle seat and showing that the seat support further includes a stationary seat anchor including a U-shaped anchor rail coupled to a top portion of an upright anchor-support pad that is included in the base;

FIG. 2 is a view similar to FIG. 1 showing the juvenile seat after it has been rotated on the swivel about 90° in a "counterclockwise" direction (represented by a double arrow) about the vertical axis to assume a "forward-facing" travel position relative to the vehicle seat and suggesting that a seat-back lock included in the juvenile seat and coupled to a seat back of the juvenile seat provides means for raising a flag lifter included in the swivel-status indicator to move a signal flag coupled to the flag lifter to a visible position above the base when the seat-back lock mates with the stationary seat anchor to block swiveling motion of the juvenile seat about the vertical axis and relative to the base as the juvenile seat arrives at the forward-facing travel position so that an observer is notified that further swiveling motion of the juvenile seat is blocked;

FIG. 3 is a view similar to FIGS. 1 and 2 showing the juvenile seat after it has been unlocked and rotated on the swivel about another 90° in the counterclockwise direction (represented by a double arrow) about the vertical axis to assume a "right-facing" entry position relative to the vehicle seat and suggesting that the flag lifter and signal flag included in the swivel-status indicator are lowered to a "not-visible" hidden position in the base in response to separation of the seat-back lock from the stationary seat anchor as a result of swiveling motion of the juvenile seat relative to the base so that an observer is notified that the juvenile seat is in an "unlocked" condition and thus able to rotate freely about the vertical axis;

FIG. 5 is a rear elevation view of a portion of the top of the seat back included in the juvenile seat of FIG. 4 showing an illustrative seat-back lock exposed in a rear opening formed in the seat back of the juvenile seat and located between a "funnel-shaped" first seat-anchor guide channel formed in the right side of the rear portion of the seat back and a funnel-shaped second seat-anchor guide channel formed in a left side of the rear portion of the seat back and showing the U-shaped anchor rail of the seat anchor is a position located outside of the funnel-shaped first seat-anchor guide channel;

FIG. 6 is a view similar to FIG. 5 showing further "counterclockwise" movement of the seat back relative to the base to locate the U-shaped anchor rail of the stationary seat anchor at a "wide" outer mouth of the funnel-shaped first seat-anchor guide channel;

FIG. 7 is a view similar to FIGS. 5 and 6 showing the result of continued "counterclockwise" movement of the seat back relative to the base to cause the U-shaped anchor rail of the stationary seat anchor on the anchor-support pad of the base to mate with the seat-back lock on the seat back once an upstanding finger included in the seat-back lock extends into a finger-receiving opening formed in the U-shaped anchor rail to lock the juvenile seat in the forward-facing travel position shown in FIG. 2;

FIG. 9 is an enlarged sectional view taken along line 9-9 of FIGS. 1 and 4 showing the stationary seat anchor coupled to the upright anchor-support pad included in the L-shaped base and showing the signal flag of the swivel-status indicator in a hidden (e.g. not-visible) position in a cavity formed in the anchor-support pad;

FIGS. 10-12 are sectional views similar to FIG. 9 showing, in sequence, three positions of the spring-loaded hook included in the seat-back lock;

FIG. 10 is a sectional view similar to FIG. 9 and taken along line 10-10 of FIG. 6 showing the hook retained in an "unlocked" position away from the U-shaped anchor rail of the stationary seat anchor by a downwardly extending spring-loaded hook-retainer latch as the juvenile seat rotates in a "counterclockwise" direction and before the rotating juvenile seat arrives at the forward-facing travel position shown in FIGS. 2, 7, and 10;

FIG. 11 is a sectional view similar to FIG. 10 just as the rotating juvenile seat arrives at the forward-facing travel position to cause the spring-loaded hook-retainer latches (one of which is shown here) to be pivoted in a clockwise direction in response to engagement of the moving hook-retainer latches with the U-shaped anchor rail of the stationary seat anchor so as to disengage the spring-loaded hook, allowing the hook to be pivoted by its spring in a counterclockwise direction toward the U-shaped anchor rail of the stationary seat anchor;

FIG. 12 is a sectional view similar to FIGS. 10 and 11 and taken along line 12-12 of FIG. 2 showing the hook after it has been pivoted by its spring to assume a "locked" position passing an upstanding finger included in the hook through a finger-receiving opening defined by the U-shaped anchor rail and trapping a center bar included in the U-shaped anchor rail of the stationary seat anchor between the finger of the hook and the rear portion of the juvenile seat to block further swiveling motion of the juvenile seat relative to the base and showing that pivoting movement of the hook caused a top edge of the finger included in the hook to contact the underside of a horizontally extending lift tab included in the flag lifter of the swivel-status indicator and then raise the signal flag carried on the flag lifter upwardly in an internal channel formed in the base to a visible position above the base to notify observers of the child restraint that the seat-back lock has been mated with the stationary seat anchor so that further swiveling motion of the juvenile seat is blocked;

FIGS. 19 and 20 show portions of a child restraint in accordance with another embodiment of the present disclosure;

DETAILED DESCRIPTION

Figure 4:
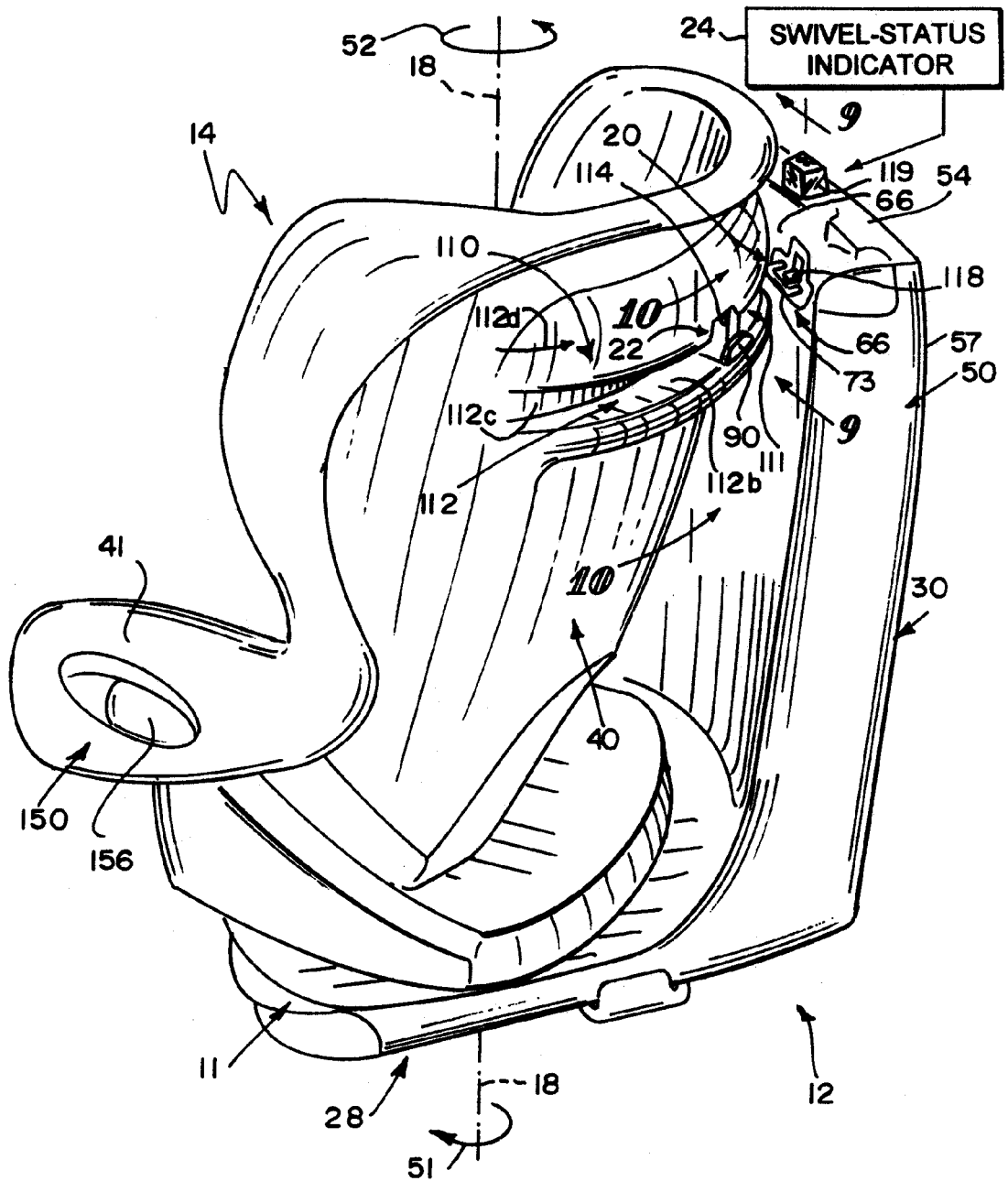
FIG. 4 is an enlarged perspective view of the juvenile seat as it is being rotated in a counterclockwise direction from the left-facing entry position of FIG. 1 toward the forward-facing travel position of FIG. 2 showing a U-shaped anchor rail included in the stationary seat anchor coupled to the base and showing that the swivel-status indicator includes a transparent flag-viewing shell on top of the base and a horizontally extending lift tab located "behind" the U-shaped anchor rail and mounted for up-and-down movement in a slot formed in the base.

A child restraint 10 in accordance with the present disclosure includes a seat support 11 including a base and a swivel-status indicator 24 coupled to base 12 as suggested in FIGS. 1, 4, and 9. Child restraint 10 also includes a rotatable juvenile seat 14 mounted on seat support 11. Seat support 11 also includes a swivel system 16 comprising a swivel 46 and a swivel-direction controller 48. Swivel 46 is coupled to base 12 and juvenile seat 14 and configured to support juvenile seat 14 for swiveling motion about a vertical axis 18 between, for example, a "left-facing" entry position shown in FIG. 1, a "forward-facing" travel position shown in FIG. 2, and a "right-facing" entry position shown in FIG. 3. Swivel-status indicator 24 provides means for notifying an observer (e.g. a caregiver) of the "swivel status" of juvenile seat 14 so that the observer can determine whether juvenile seat 14 is in the forward-facing travel position or one of the side-facing entry positions. Other embodiments of swivel-status indicators in accordance with the present disclosure are illustrated in FIGS. 17-20.

Seat support 11 of child restraint 10 also includes a stationary seat anchor 20 coupled to base 12 as suggested in FIGS. 1, 4, and 9. Stationary seat anchor 20 includes an exposed U-shaped anchor rail 73 as shown in FIGS. 1-5. Juvenile seat 14 includes a seat-back lock 22 that is configured to mate with U-shaped anchor rail 73 of seat anchor 20 to block swiveling motion of juvenile seat 14 as suggested in FIGS. 5-7 and 10-12.

Figure 13:
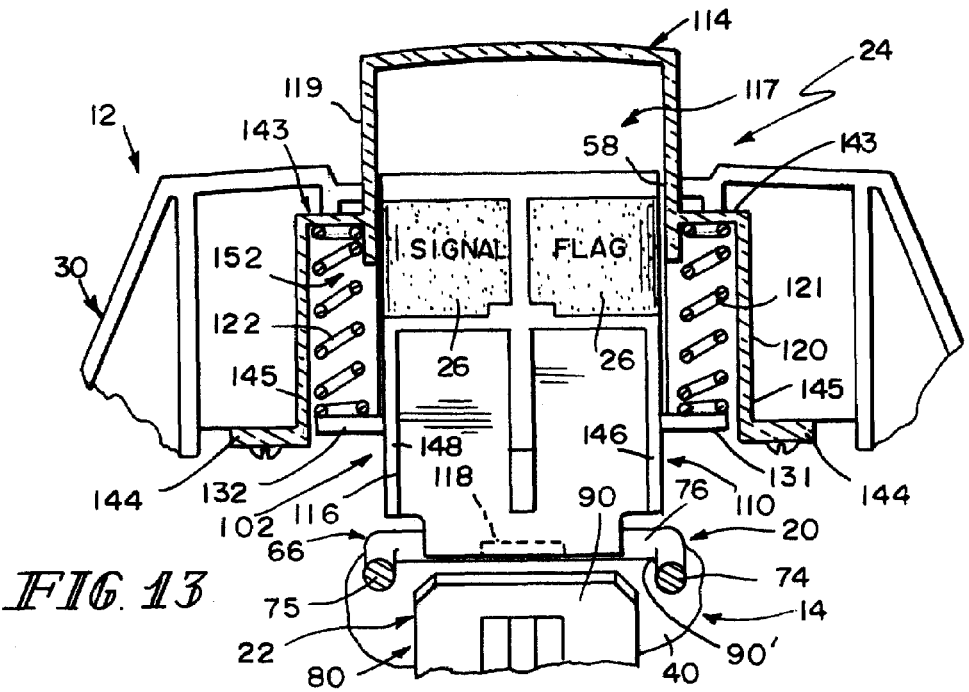
FIG. 13 is a sectional view taken along line 13-13 of FIG. 11 showing the signal flag of the swivel-status indicator in a hidden (e.g. not-visible) position in the base.
Figure 14:
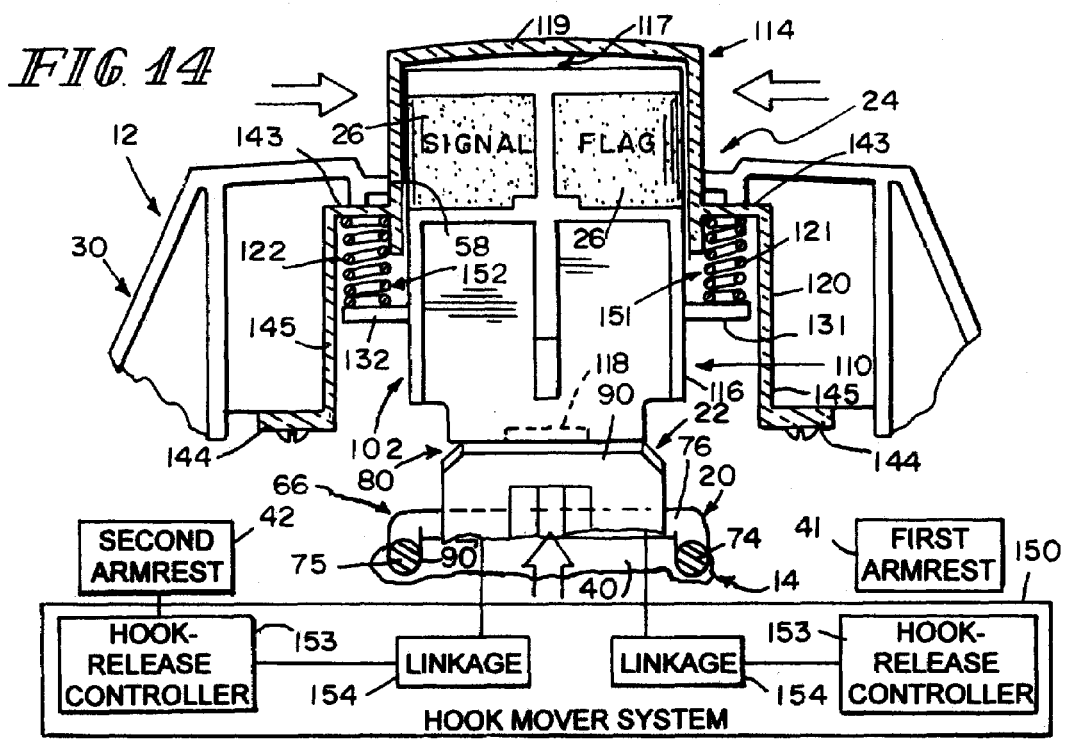
FIG. 14 is a sectional view similar to FIG. 13 and taken along line 14-14 of FIG. 12 showing the signal flag of the swivel-status indicator in the visible position above the base and inside a transparent dome of a flag-viewing shell coupled to the base.

Swivel-status indicator 24 cooperates with seat-back lock 22 as suggested, for example, in FIGS. 10-12, 13, and 14 to raise a signal flag 26 included in swivel-status indicator 24 to a visible position above base 12 as shown in FIGS. 12 and 14 to notify an observer that seat-back lock 22 has mated with stationary seat anchor 20 to block swiveling motion of juvenile seat 14 about vertical axis 18 relative to base 12. Swivel-status indicator 24 is coupled to an upper portion of base 12 as suggested in FIGS. 1-4 and 9-12 so that it can be seen easily by a caregiver that has placed a child on juvenile seat 14 and swiveled juvenile seat 14 from one of the side-facing entry positions shown in FIGS. 1 and 3 to the forward-facing travel position shown in FIG. 2.

Base 12 is L-shaped in an illustrative embodiment as suggested in FIGS. 1 and 4. Base 12 includes a horizontally extending swivel-mount pad 28 arranged to underlie juvenile seat 14 and an upright anchor-support pad 30 arranged to extend upwardly from a rear edge of swivel-mount pad 28. Seat anchor 20 and swivel-status indicator 24 are coupled to a top portion 50 of upright anchor-support pad 30 as suggested in FIGS. 1-4. Base 12 is adapted to be anchored to a vehicle seat 32 using any suitable means such as a lap-and-shoulder belt restraint harness 34 associated with vehicle seat 32.

Juvenile seat 14 includes a seat bottom 38, a seat back 40 extending upwardly from a rear portion of seat bottom 38, a seat-back lock 22 coupled to seat back 40, and first and second armrests 41, 42 coupled to seat bottom 38 and seat back 40 as shown, for example, in FIG. 1. Juvenile seat 14 also includes a restraint harness 44 coupled to seat bottom 38 and seat back 40 or any other suitable juvenile restraint means.

Swivel system 16 includes a swivel 46 and a swivel direction controller 48 as shown diagrammatically in FIGS. 1-3. Swivel 46 is coupled to swivel-mount pad 28 of base 12 and to seat bottom 38 of juvenile seat 14 and is a device joining two parts so that one or both can pivot freely (as on a bolt or pin). Swivel direction controller 48 is configured to provide means cooperating with swivel 46 for allowing juvenile seat 14 to rotate about vertical axis 18 in only one direction (selected by a caregiver) at a time. Thus, a caregiver can operate swivel direction controller 48 to allow juvenile seat 14 to rotate about vertical axis 18 from the forward-facing travel position shown in FIG. 2 in either (1) a clockwise direction 51 to assume the left-facing entry position shown in FIG. 1 or (2) a counterclockwise direction 52 to assume the right-facing entry position shown in FIG. 3.

Seat anchor 20 is coupled to top portion 50 of upright anchor-support pad 30 of base 12 as shown, for example, in FIGS. 4 and 9. Top portion 50 is formed to include a top wall 54 and front and back walls 56, 57 depending from top wall 54 as shown in FIG. 9. Top wall 54 is formed to include a flag aperture 58 opening into an interior channel 59 formed between front and back walls 56, 57. Front wall 56 is arranged to face toward seat back 40 of juvenile seat 14 when juvenile seat 14 lies in the forward-facing travel position as shown in FIG. 12. Front wall 56 is formed to include an open window 64 associated with seat anchor 20 and swivel-status indicator 24 as shown, for example, in FIGS. 3, 4, and 9.

Seat anchor 20 includes an anchor bar 66 and a bar foundation 68 as shown in FIG. 9. Anchor bar 66 is arranged to project from interior channel 59 outwardly through open window 64 formed in front wall 56 so that anchor bar 66 can mate with seat-back lock 22 when juvenile seat 14 is moved to assume the forward-facing travel position as suggested in FIGS. 7 and 12. Bar foundation 68 is mounted in a stationary position, for example, in a region of interior channel 59 near open window 64 as suggested in FIG. 9. In an illustrative embodiment, bar foundation 68 is made of a rigid material such as steel.

As suggested in FIG. 9, anchor bar 66 has a first leg 71 coupled to bar foundation 68, a second leg 72 arranged to lie in spaced-apart relation to first leg 71 and coupled to bar foundation 68, and a U-shaped anchor rail 73 arranged to interconnect "free" ends of first and second legs 71, 72 and lie generally outside of interior channel 59 formed in upright anchor-support pad 30. U-shaped anchor rail 73 includes a short first segment 74 coupled to first leg 71, a short second segment 75 coupled to second leg 72, and a relatively longer third segment 76 arranged to interconnect "free" ends of first and second segments 74, 75 as suggested in FIGS. 6A and 9. Seat-back lock 22 is configured to mate with third segment 76 of U-shaped anchor rail 73 of anchor bar 66 as suggested in FIG. 12 to retain juvenile seat 14 in the forward-facing travel position relative to base 12.

Seat-back lock 22 is shown, for example, in FIGS. 8 and 10-12. Seat-back lock 22 includes a movable hook 80 mounted for pivotable movement about a horizontal axis 179 on a pivot shaft 79 coupled to seat back 40, a first hook-retainer latch 81 mounted for pivotable movement about another horizontal axis 183 on a pivot shaft 83 coupled to seat back 40, and a second hook-retainer latch 82 mounted for pivotable movement about horizontal axis 183 on pivot shaft 83' (or a pivot shaft 83) independent of pivotable first hook-retainer latch 82. Seat-back lock 22 also includes a hook-return spring 84 coupled to hook 80 and seat back 40, a first latch-return spring 86 coupled to first hook-retainer latch 81 and seat back 40, and a second latch-return spring 88 coupled to second hook-retainer latch 82 and seat back 40 as suggested in FIGS. 5 and 10. In the illustrated embodiment, each of springs 84, 86, and 88 is a torsion spring.

Figure 8:
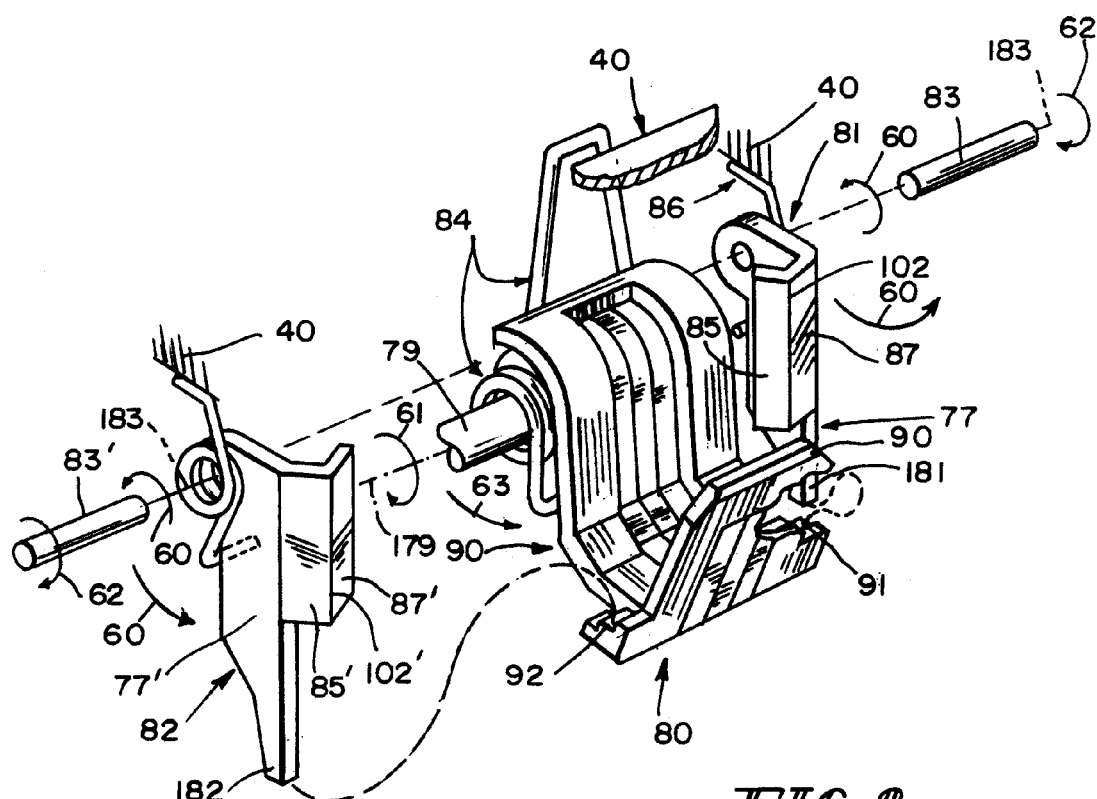
FIG. 8 is an enlarged exploded perspective view of components included in an illustrative seat-back lock along with diagrammatic representations of portions of the adjacent seat back showing that the seat-back lock includes a spring-loaded "wide" hook located between two relatively "narrow" spaced-apart spring-loaded hook-retainer latches and configured to include an upstanding finger sized to extend into a finger-receiving opening formed in the U-shaped anchor rail and showing that downwardly projecting tips of the two hook-retainer latches are configured to engage companion flange plates included in the hook on opposite sides of the finger to retain the hook normally in an "unlocked" position as shown, for example, in FIG. 10.

Hook 80 includes an axle mount 89 coupled to pivot shaft 79, an upstanding finger 90 cantilevered to axle mount 89, a first flange plate 91 coupled to one side of axle mount 89, and a second flange plate 92 coupled to another side of axle mount 89 as shown, for example, in FIG. 8. Finger 90 is arranged to lie between first and second flange plates 91, 92 as shown, for example, in FIG. 8.

Hook 80 is mounted for movement on pivot shaft 79 relative to seat back 40 between an "unlocked" position shown, for example, in FIG. 10 and a "locked" position shown, for example, in FIG. 12. In the unlocked position, hook 80 is disengaged from U-shaped anchor rail 73 of anchor bar 66 of stationary seat anchor 20 as suggested in FIG. 10 to allow swiveling motion of juvenile seat 14 about vertical axis 18 relative to base 12. In the locked position, hook 80 cooperates with seat back 40 of juvenile seat 14 to retain the relatively longer third segment 76 of U-shaped anchor rail 73 of anchor bar 66 of stationary seat anchor 20 as suggested in FIG. 10 in a rearwardly opening groove 94 formed in seat back 40 and arranged to face toward stationary seat anchor 20 when juvenile seat 14 is moved to assume the forward-facing travel position as shown, for example, in FIG. 12. In the illustrated embodiment, in the locked position, upstanding finger 90 of hook 80 extends upwardly into a finger-receiving opening 90' defined by U-shaped anchor rail 73 and provided between U-shaped anchor rail 73 and front wall 56 of upper portion 50 of anchor-support pad 30 of L-shaped base 12 as suggested in FIGS. 7 and 12.

As also shown in FIG. 8, first hook-retainer latch 81 includes an axle mount 77 coupled to pivot shaft 83 and configured to terminate at a downwardly extending tip 181 and a pivot actuator 75 coupled to axle mount 77. Pivot actuator 75 is "roof-shaped" in an illustrative embodiment and includes a left-side cam surface 85 and a right-side cam surface 87 arranged to interconnect left-side cam surface 85 and axle mount 77. Left-side and right-side cam surfaces 85, 87 intersect at a raised ridge 102. When viewed from above in FIG. 8, left-side cam surface 85 has a "negative" slope and right-side cam surface 87 has a "positive" slope. Similarly, second hook-retainer latch 82 includes an axle mount 77' coupled to pivot shaft 83' and configured to terminate at a downwardly extending tip 182 and a pivot actuator 75' coupled to axle mount 77'. Pivot actuator 75' includes left-side and right-side cam surfaces 85' and 87' and raised ridge 102'. When viewed from above (in FIG. 8), left-side cam surface 85' has a negative slope and right-side cam surface 87' has a positive slope.

Seat back 40 of juvenile seat 14 is formed to include guide means 110 for guiding U-shaped anchor rail 73 of stationary seat anchor 20 to engage seat-back lock 22 mounted in seat back 40 during rotating movement of juvenile seat 14 about vertical axis 18 relative to base from either the left- or right-facing entry positions of FIGS. 1 and 3, respectively, to the forward-facing travel position of FIG. 2. In an illustrative embodiment, guide means 110 includes a first seat-anchor guide channel 111 formed in the right side of the rear portion of seat back 40 to communicate with a central opening 114 formed in seat back 40 to expose seat-back lock 22 as shown in FIGS. 4-7. Guide means 110 also includes a second seat-anchor guide channel 112 formed in the left side of the rear portion of seat back 40 also to communicate with central opening 114 as shown in FIGS. 4-7.

Figure 5:
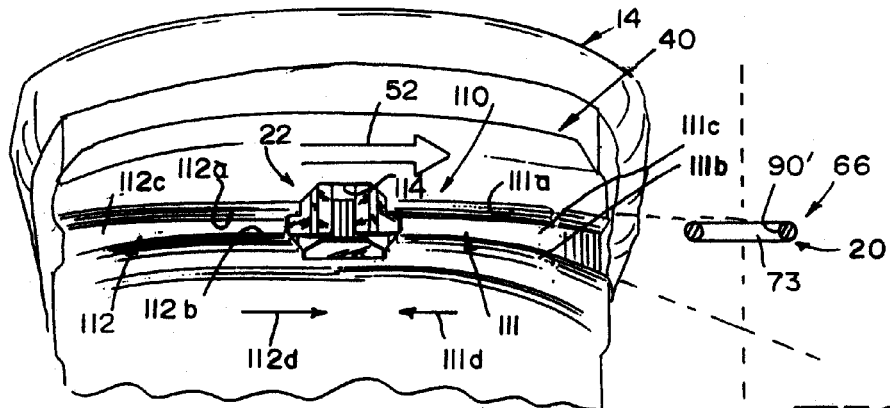
FIGS. 5-7 are partial rear elevation views of the juvenile seat of FIGS. 1-4 showing (in a diagrammatic manner) "swiveling motion" of the juvenile seat relative to the U-shaped anchor rail included in the stationary seat anchor coupled to the L-shaped base to cause the seat-back lock located in an opening formed in a center portion of the seat back of the juvenile seat to reach and mate with the stationary U-shaped anchor rail to block further swiveling motion of the juvenile seat relative to the base.
Figure 6:
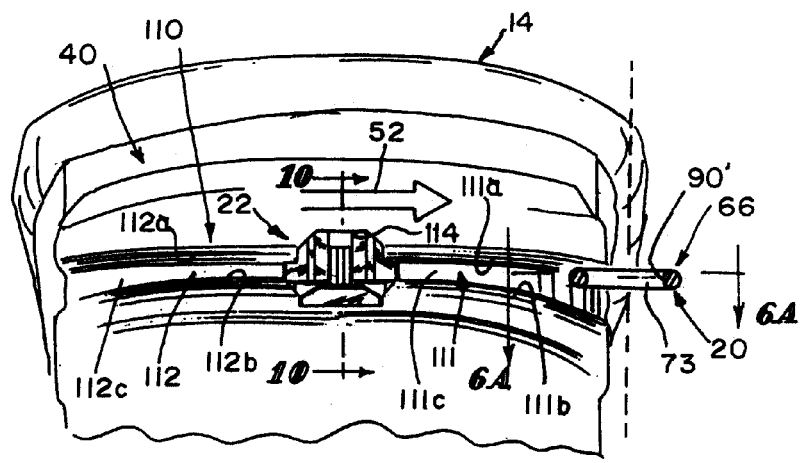
Figure 6A:
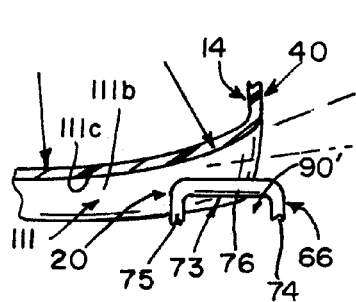
FIG. 6A is a sectional view taken along line 6A-6A of FIG. 6 showing a "horizontal" lead-in of the U-shaped anchor rail of the stationary seat anchor into the wide outer mouth of the moving funnel-shaped first seat-anchor guide channel.
Figure 7:
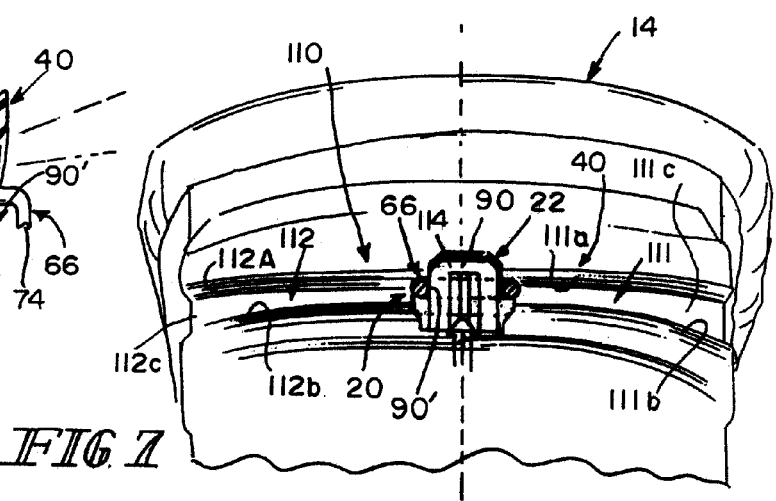

As suggested in FIGS. 5-7, seat-back lock 22 is exposed in central opening 114 that is formed in seat back 40 and arranged to lie between seat-anchor guide channels 111 and 112. In an illustrative embodiment, first seat-anchor guide channel 111 is funnel-shaped and defined by upper and lower guide walls 111a and 111b converging in a direction 111d extending toward central opening 114 and a rear wall 111c interconnecting guide walls 111a and 111b. First seat anchor guide channel 111 provides means for guiding U-shaped anchor rail 73 of stationary seat anchor 20 to mate with finger 90 of hook 80 as juvenile seat 14 rotates in counterclockwise direction 52 relative to base 12 as suggested in FIGS. 5-7 and 10-12. Similarly, second seat-anchor guide channel 112 is funnel-shaped and defined by upper and lower guide walls 112a and 112b converging in a direction 112d extending toward central opening 114 and a rear wall 112c interconnecting guide walls 112a and 112b. Second seat-anchor guide channel 112 provides means for guiding U-shaped anchor rail 73 of stationary seat anchor 20 to mate with finger 90 of hook 80 as juvenile seat 14 rotates in clockwise direction 51 relative to base 12.

An illustrative process for mating seat-back lock 22 to stationary seat anchor 20 is shown in a sequence illustrated in FIGS. 5-7 and 10-12. Seat-back lock 22 mates with stationary seat anchor 20 normally whenever juvenile seat 14 is rotated about vertical axis 18 either (1) from the left-facing entry position shown in FIG. 1 in counterclockwise direction 52 to arrive at the forward-facing travel position shown in FIG. 2 or (2) from the right-facing entry position shown in FIG. 3 in clockwise direction 51 to arrive at the forward-facing travel position shown in FIG. 2. If, owing to an unexpected event, such mating does not take place in response to rotation of juvenile seat 14, seat-back lock 22 will mate with stationary seat anchor 20 in response to movement of seat back 40 in a generally rearward direction 100 (see FIGS. 10 and 11) toward upper portion 50 of anchor-support pad 30 of L-shaped base 12 owing to elasticity of juvenile seat 14 and/ or to external force loads applied in direction 100 to juvenile seat 14.

Hook 80 is shown in an "unlocked" position in FIGS. 6 and 10. First latch-return spring 86 provides means for yieldably urging first hook-retainer latch 81 to rotate in a counterclockwise direction 60 to cause a tip 181 of first hook-retainer latch 81 to engage first flange plate 91 of hook 80 to urge hook 80 to rotate in a clockwise direction 61 (against a torsional biasing force applied by hook-return spring 84) to assume the unlocked position shown in FIG. 10. Similarly, second latch-return spring 88 provides means for yieldably urging second hook-retainer latch 82 to rotate in counterclockwise direction 60 (see FIG. 8) to cause a tip 182 of second hook-retainer latch 92 to engage second flange plate 92 of hook 80 to urge hook 80 to rotate in a clockwise direction 61 (against the torsional biasing force applied by hook-return spring 84). Hook 80 will stay in the unlocked position as long as one or both of spring-loaded first and second hook-retainer latches 81, 82 engage the first and second flange plates 91 to hold hook 80 in the unlocked position as suggested in FIG. 10.

U-shaped anchor rail 73 of anchor bar 66 is arranged to engage both of spring-loaded first and second hook-retainer latches 81, 82 (one after the other) as juvenile seat 14 rotates about vertical axis (either in clockwise direction 51 or counterclockwise direction 52 and arrives at the forward-facing travel position. When juvenile seat 14 rotates in clockwise direction 51, U-shaped anchor rail 73 will engage, in sequence, left-side cam surface 85' on second hook-retainer latch 82 and then left-side cam surface 85 on first hook-retainer latch 81. When juvenile seat 14 rotates in counterclockwise direction 52, U-shaped anchor rail 73 will engage, in sequence, right-side cam surface 87 on first hook-retainer latch 81 and then right-side cam surface 87' on second hook-retainer latch 82.

Engagement of U-shaped anchor rail 73 and hook-retainer latches 81, 82 causes both hook-retainer latches 81, 82 to (1) rotate in counterclockwise direction 62 against the torsional biasing force applied by companion latch-return springs 86, 88 and (2) disengage flange plates 91, 92 of hook 80 as suggested in FIG. 11. This "plate-disengagement" action releases hook 80 to allow hook-return spring 84 to urge hook 80 to rotate in counterclockwise direction 63 to assume the locked position shown in FIG. 12. In the locked position, upstanding finger 90 of hook 80 passes through finger-receiving opening 90' as suggested in FIG. 7 and traps relatively longer segment 76 of U-shaped anchor rail 73 of anchor bar 66 in rearwardly opening groove 94 formed in seat back 40 of juvenile seat 14 as suggested in FIG. 12 to establish mating engagement of seat-back lock 22 and seat anchor 20 to block further swiveling motion of juvenile seat 14 about vertical axis 18 relative to L-shaped base 12.

Swivel-status indicator 24 includes a signal unit 102 comprising a signal flag 26 and a flag lifter 110 coupled to signal flag 26, first and second lifter-return springs 121, 122, and a flag-viewing shell 114 as shown, for example, in FIGS. 9, 13, and 14. Signal unit 102 is mounted for movement relative to base 12 between a first position representing an "unlocked" (swiveling) condition to juvenile seat 14 as shown, for example, in FIGS. 9 and 13 and a second position representing a "locked" (non-swivel) condition of juvenile seat 14 as shown, for example, in FIGS. 12 and 14.

Flag lifter 110 includes a vertically extending flag support 116 and a horizontally extending lift tab 118 coupled to a lower end of flag support 116 as shown best in FIG. 9. Flag support 16 is mounted for back-and-forth (e.g. up-and-down) movement in internal channel 59 of top portion 50 of anchor-support pad 30 of base 12. Lift tab 118 is coupled to flag-support 116 for up-and-down movement in open window 64 of front wall 56 of top portion 50 in response to up-and-down movement of flag support 116 in internal channel 59. In an illustrative embodiment, one signal flag 26 is carried on a front face of flag support 116 and another signal flag 26 is carried on a back face of flag support 116.

Flag-viewing shell 114 is made of a transparent material and includes a frame 120 mounted in a stationary position in internal channel 59 of top portion 50 and a dome 119 coupled to frame 120 and arranged to extend through flag aperture 58 formed in top wall 54 of top portion 50. Dome 119 of flag-viewing shell 114 rises above top portion 50 of base 12 as shown, for example, in FIGS. 9, 13, and 14.

First and second lifter-return springs 121, 122 act between, for example, a portion of shell 114 and flanges 131, 132 coupled to flag support 116 and included in flag lifter 110 as shown in FIGS. 13 and 14. Each lifter-return spring 121, 122 is a coiled compression spring in an illustrative embodiment. Normally, lifter-return springs 121, 122 cooperate to define means for yieldably urging flag lifter 110 downwardly to assume a lowered position in internal channel 59 formed in anchor-support pad 30 as shown in FIGS. 9 and 13. In this lowered position, signal flags 26 are located in a hidden (e.g. "not-visible") position inside base 12.

Finger 90 of hook 80 moves to engage the underside of lift tab 118 of flag lifter 110 and move flag lifter 110 upwardly to a raised position in internal channel 59 as shown in FIGS. 8 and 10 whenever juvenile seat 14 is rotated about vertical axis 18 to assume the forward-facing travel position. Upward movement of flag lifter 110 raises signal flags 127 to a "visible" position above base 12 and inside dome 119 of flag-viewing shell 114 as shown in FIGS. 12 and 14.

A hook mover system 150 is provided as suggested in FIGS. 10-12, 13, and 14 for affirmatively withdrawing finger 90 of hook 80 from finger-receiving opening 90' in U-shaped anchor rail 73 (at the option of a caregiver) and returning hook 80 to the unlocked position shown in FIG. 10. In an illustrative embodiment, hook mover system 150 includes a hook-release controller 153 coupled to each armrest 41, 42 and a separate linkage 154 coupling each hook-release controller 153 to movable hook 80 as suggested diagrammatically in FIG. 14 and in FIGS. 10-12.

Frame 120 of flag-viewing shell 114 includes first and second dome supports 141, 142 as suggested in FIGS. 13 and 14. Dome 119 is arranged to lie between and is coupled to first and second supports 141, 142 to allow portions of signal flag 26 and flag lifter 110 to move into a flag-receiving region 117 formed in dome 119 as suggested in FIGS. 12 and 14 in response to upward movement of flag lifter 110 in internal channel 59 of top portion 50 of anchor-support pad 30 of base 12 to the raised position placing signal flag 26 in a visible position above base 12 and inside dome 119. As suggested in FIG. 13, first and second dome supports 141, 142 are configured to allow signal flag 26 and flag lifter 110 to move downwardly to the lowered position in internal channel 59 formed in anchor-support pad 30 so that signal flag 26 is located in base 12 and is hidden and not visible in interior region 117 of dome 119.

As suggested in FIGS. 13 and 14, each of first and second dome supports 141, 142 includes a spring mount 143 coupled to dome 119, a base mount 144 coupled to anchor-support pad 30 of base, and a riser 145 arranged to extend upwardly from base mount 144 to spring mount 143. Risers 145 are located in spaced-apart relation to one another to locate first and second lifter-return springs 121, 122 and a portion of flag support 116 therebetween.

First lifter-return spring 121 is arranged to lie in a space 151 provided between a first shoulder 146 included in flag support 116 and riser 145 of first dome support 141 as suggested in FIGS. 13 and 14. First lifter-return spring 121 is arranged to act between spring mount 143 of first dome support 141 and flange 131 of flag support 116. Flange 131 is cantilevered to first shoulder 146 of flag support 116 and arranged to extend away from first shoulder 146 in a direction toward riser 145 of first dome support 141. Space 151 has a variable size that changes in response to up-and-down movement of flag lifter 110 relative to anchor-support pad 30 of base 12. Space 151 is bordered, at least in part, by flange 131, first shoulder 146, and spring mount 143 and riser 145 of first dome support 141.

Second lifter-return spring 122 is arranged to lie in a space 152 provided between a second shoulder 148 included in flag support 116 and riser 145 of second dome support 142 as suggested in FIGS. 13 and 14. Second lifter-return spring 122 is arranged to act between spring mount 143 of second dome support 142 and flange 132 of flag support 116. Flange 132 is cantilevered to second shoulder 148 and arranged to extend away from second shoulder 148 in a direction toward riser 145 of second dome support 142. Space 152 has a variable size that changes in response to up-and-down movement of flag lifter 110 relative to anchor-support pad 30 of base 12.

Space 152 is bordered, at least in part, by flange 132, second shoulder 148, and spring mount 143 and riser 145 of second dome support 142.

Figure 15:
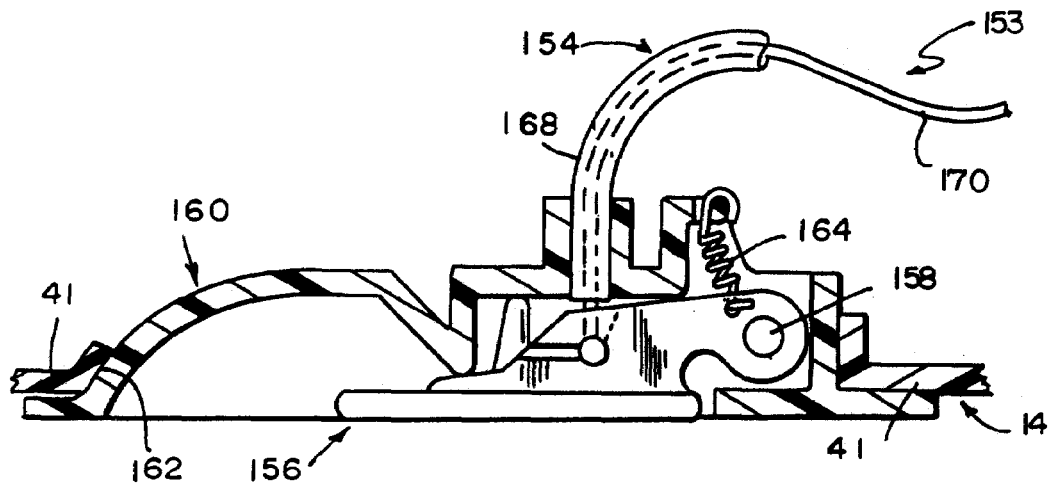
FIG. 15 is an enlarged sectional view taken along line 15-15 of FIG. 1 showing an actuator lever included in a hook-release controller associated with the seat-back lock and coupled to an armrest included in the juvenile seat.
Figure 16:
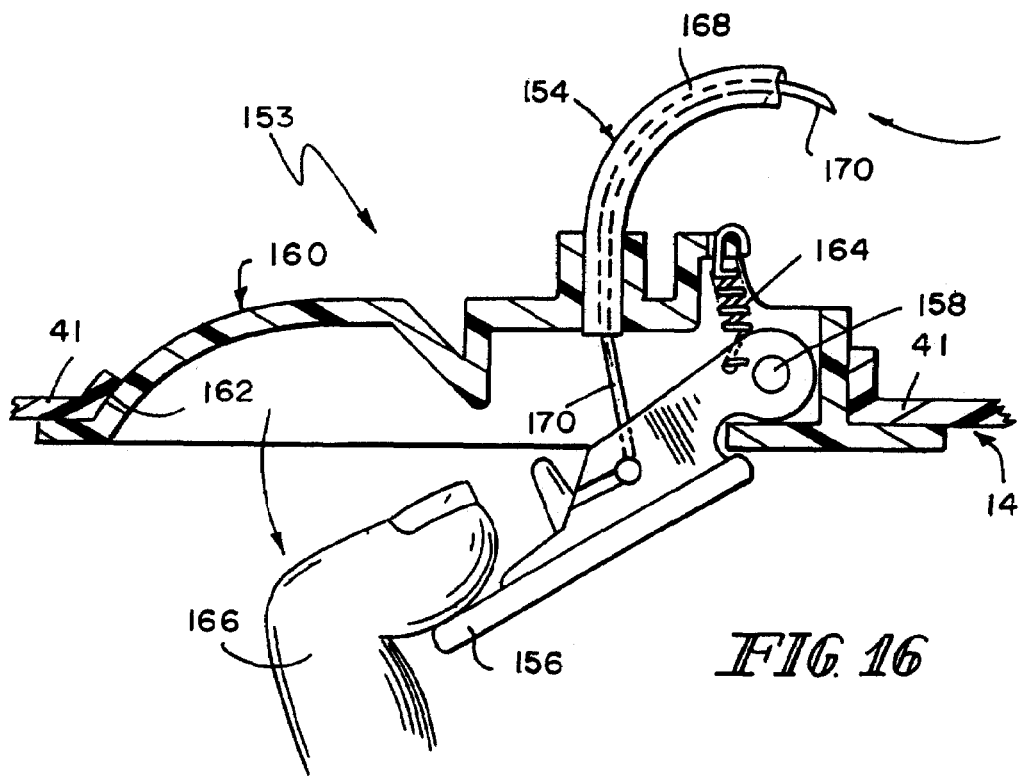
FIG. 16 is a sectional view similar to FIG. 15 showing pivoting motion of the actuator lever about a vertical pivot axis to activate a linkage interconnecting the actuator lever and the hook to cause the hook to move from the locked position shown, for example, in FIG. 12 to the unlocked position shown, for example, in FIG. 10.

An illustrative hook-release controller 153 is coupled to first armrest 41 and is shown, for example, in FIGS. 15 and 16. Hook-release controller 153 includes an actuator lever 156 mounted for pivotable movement on a pivot post 158 coupled to a housing 160 mounted in an aperture 162 formed in armrest 41. Hook-release controller 153 also includes a return spring 164 coupled to housing 160 and actuator lever 156. Return spring 164 is configured to provide means for yieldably moving actuator lever 156 from an extended position shown away from housing 160 in FIG. 16 to a retracted position in housing 160 shown in FIG. 15 whenever a caregiver 166 releases actuator lever 156.

An illustrative linkage 154 includes a tube 168 coupled to housing 160 and a control wire 170 extending through a passageway formed in tube 168 as suggested in FIGS. 15 and 16. Control wire 170 is coupled at one end to actuator lever 156 as suggested in FIGS. 15 and 16 and at an opposite end to axle mount 89 of hook 80 as shown in FIGS. 10-12. Pivoting movement of actuator lever 156 about pivot post 158 in direction 172 as suggested in FIG. 16 pulls on control wire 170 to cause hook 80 to pivot from the locked position shown in FIG. 12 to the unlocked position shown in FIG. 10. Spring-loaded hook-retainer latches 81, 82 engage plate flanges 91, 92 on hook 80 to retain hook 80 in that unlocked position until hook-retainer latches 81, 82 later engage U-shaped anchor rail 73 of stationary seat anchor 20 during swiveling motion of juvenile seat 14 toward the forward-facing position shown in FIGS. 2, 7, and 12.

Figure 17:
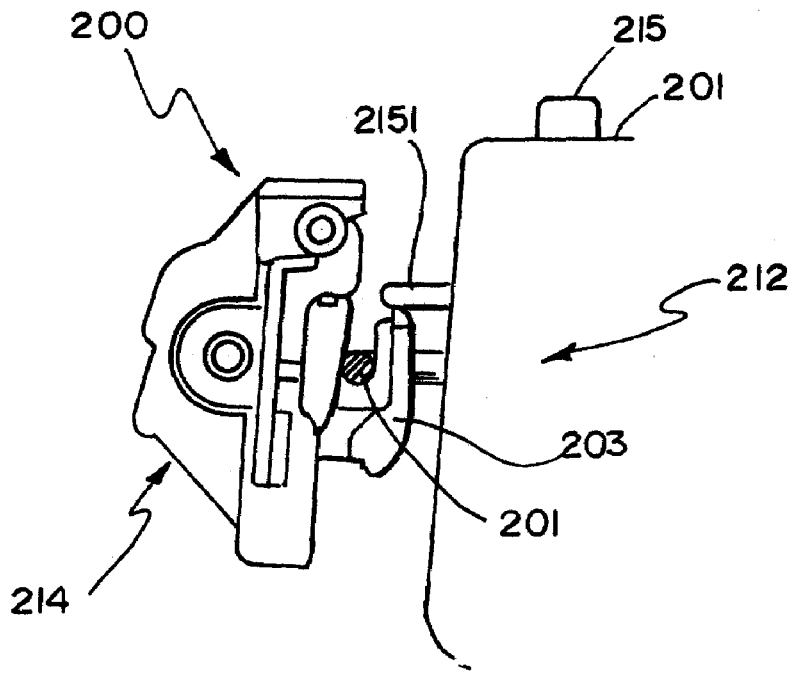
FIG. 17 is a sectional view of a portion of a child restraint in accordance with another embodiment of the present disclosure showing engagement of a movable hook included in a seat-back lock coupled to a seat back of a swiveling juvenile seat and a seat anchor coupled to an anchor-support pad in a base of a seat support to raise a lift tab included in a flag lifter in a swivel-status indicator to a raised position relative to the seat anchor so that a signal flag coupled to the flag lifter is moved to a visible position above the anchor-support pad of the base to notify observers of the child restraint that the seat-back lock has been mated with the seat anchor to block any further swiveling motion of the juvenile seat relative to the base.
Figure 18:
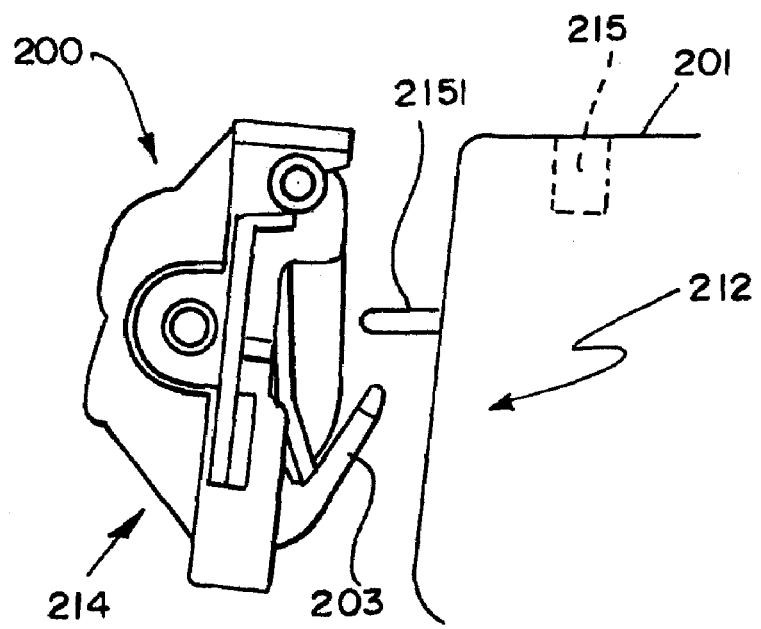
FIG. 18 is a view similar to FIG. 17 showing disengagement of the movable hook included in the seat-back lock and the seat anchor on the base to allow the lift tab to move downwardly to assume a relatively lower position so that the signal flag coupled to the flag lifter is moved to a hidden (e.g. not visible) position in the upright anchor-support pad of the base to notify observers of the child restraint that the seat-back lock has separated from the seat anchor to allow swiveling motion of the juvenile seat relative to the base.

In the embodiment of FIGS. 17 and 18, a child restraint 200 includes a swivel-status indicator that allows the user, i.e., the person manipulating juvenile seat 214 of child restraint 200 to ensure that juvenile seat 214 is locked in the utilization position and therefore that the locking elements ensuring fixation of the upper part of the backrest of juvenile seat 214 to its base 212 are affixed in a suitably solid manner.

A warning flag 215 is movable between a deployed position in which it is visible by the user and a retracted position in which it is hidden in the interior of base 212 of child restraint 200 and therefore not visible. The warning flag 215 is associated with an informing bolt 2151 leading from base 212. A means of return, using for example a compression spring (not shown in the figures), tends to bring the warning flag 215 into its deployed position.

When juvenile seat 214 pivots from the installation position to the utilization position, hook 203 engages bar 202 and enters into contact with bolt 2151. Hook 203 opposes the compression force of the spring exerted on warning flag 215 in such a way that it moves from its retracted position to its deployed position and becomes visible by the user of juvenile seat 214 (FIG. 17).

The warning flag 215 may be of a particular color or may be a message informing the user of juvenile seat 214 of the fixation status of the fixation system.

When juvenile seat 214 pivots from the utilization position to an installation position, hook 203 unlatches and frees bolt 2151 in such a way that under the effect of the compression spring, warning flag 215 moves to the retracted position in which it is no longer visible by the user of juvenile seat 214 (FIG. 18).

The user is thus in a position to determine whether the hook is in the locked position and therefore if the juvenile seat is correctly locked in the utilization position.

Figure 19A:
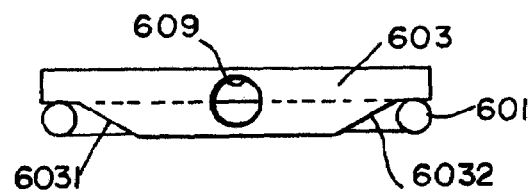
FIG. 19a shows a hook included in a seat-back lock of a swiveling juvenile seat mated with a U-shaped anchor bar included in seat anchor coupled to a base included in a seat support to block swiveling motion of the juvenile seat relative to the base.
Figure 19B:
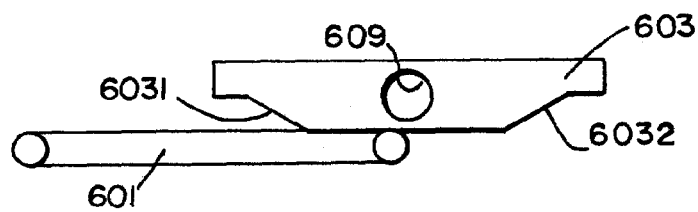
FIG. 19b is a view similar to FIG. 19a showing separation of the hook from the U-shaped anchor bar.
Figure 19C:
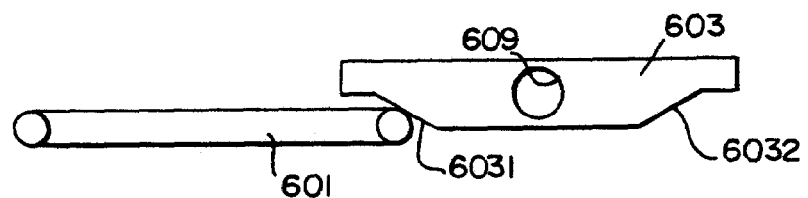
FIG. 19c is a view similar to FIGS. 19a and 19b showing further movement of the hook away from the U-shaped anchor bar.

A child restraint 600 in accordance with another embodiment of the disclosure is shown, for example, in FIGS. 19a, b, c and 20a, b. In this embodiment, a warning flag "pops up" to signal an unlocked condition of a swiveling juvenile seat 614 and is retracted into a base 612 of child restraint 600 to signal a locked condition.

A warning flag 620 is movable between a deployed position in which it is visible by the user and a retracted position in which it is hidden in the interior of the base of the child restraint and therefore not visible. Warning flag 620 is associated with an informing bolt 621 leading from the base. A means of return, using for example a compression spring (not shown in the figures), tends to bring warning flag 620 into its deployed position.

When juvenile seat 614 pivots from the installation position to the utilization position, hook 603 engages bar 601 and enters into contact with the bolt 621. Hook 603 opposes the compression force exerted by the spring on warning flag 620 in such a way that it moves from its deployed potion (FIGS. 20a and 20b) to its retracted position and becomes non visible by the user of the child car sear (FIG. 20c).

The warning flag 620 may be of a particular color or may bear a message informing the user of the juvenile seat 614 of the fixation status of the fixation system.

Figure 20A:
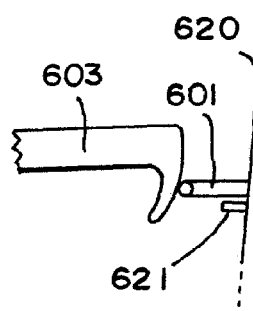
FIGS. 20a and 20b show a signal flag included in a swivel-status indicator in a visible position above an anchor-support pad included in the base to notify an observer that the seat-back lock is separated from the seat anchor to allow swiveling motion of the juvenile seat relative to the base.
Figure 20B:
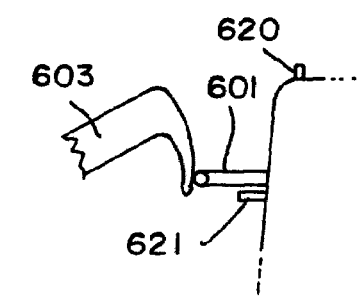
Figure 20C:
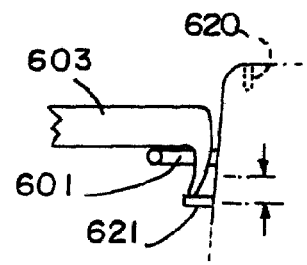
FIG. 20c is a view similar to FIGS. 20a and 20b showing engagement of a movable hook included in the seat-back lock and the seat anchor to move a lift tab included in a flag lifter in the swivel-status indicator from a raised position shown in FIGS. 20a and 20b to a lowered position so that the signal flag coupled the flag lifter is moved to a hidden (e.g. not visible) position in the upright anchor-support pad of the base to notify observers that the seat-back lock is mated with the seat anchor to block any further swiveling motion of the juvenile seat relative to the base.

When juvenile seat 614 pivots from the utilization position to the installation position, hook 603 unlatches and frees bolt 621 in such a way that under the compression effect of the spring, warning flag 620 moves to the deployed position in which it is visible by the user of the juvenile seat 614 (FIGS. 20a and 20b).

The invention claimed is:

1. A child restraint comprising
a seat support including a base adapted to set on a vehicle seat, a seat anchor coupled to the base, and a swivel coupled to the base,
a juvenile seat mounted on the swivel for swiveling motion relative to the base about an axis of rotation between a forward-facing travel position and a side-facing entry position, the juvenile seat including a seat bottom mounted on the swivel, a seat back arranged to extend upwardly away from the seat bottom, and a seat-back lock coupled to the seat back to move therewith during swiveling motion of the juvenile seat relative to the base and configured to mate with the seat anchor upon movement of the juvenile seat to assume the forward-facing travel position to block further swiveling motion of the juvenile seat, and
a swivel-status indicator coupled to the base and configured to cooperate with the seat-back lock to move an indicator and thereby provide signal means for generating a notification signal that the seat-back lock has mated with the seat anchor to notify an observer that the juvenile seat has been locked to the base in the forward-facing travel position.

2. The child restraint of claim 1, the swivel-status indicator includes a flag mover mounted for movement relative to the base and a signal flag coupled to the flag mover for motion therewith relative to the base and the seat-back lock includes actuator means for engaging the flag mover in response to arrival of the juvenile seat at the forward-facing travel position and mating of the seat-back lock and the seat anchor and for moving the flag mover relative to the base to cause the signal flag to move relative to the base from a first position representing an unlocked condition of the juvenile seat wherein the juvenile seat is free to swivel relative to the base to a second position representing a locked condition of the juvenile seat wherein the juvenile seat is blocked from swiveling motion relative to the base.

3. The child restraint of claim 2, wherein the base is formed to include an internal channel and a wall formed to include a flag aperture opening into the internal channel and the flag mover is arranged to extend into the internal channel formed in the base and move therein during movement of the signal flag between the first and second positions.

4. The child restraint of claim 3, wherein the base includes a swivel-mount pad arranged to lie under the juvenile seat and coupled to the swivel and an anchor-support pad extending upwardly from the swivel-mount pad and terminating at the wall formed to include the flag aperture, the anchor-support pad is formed to include the internal channel, and the seat anchor is coupled to the anchor-support pad, and the signal flag is arranged to lie outside of the internal channel when the signal flag is moved to assume the second position.

5. The child restraint of claim 3, wherein the base includes a swivel-mount pad arranged to lie under the juvenile seat and coupled to the swivel and an anchor-support pad extending upwardly from the swivel-mount pad and terminating at the wall formed to include the flag aperture, the anchor-support pad is formed to include the internal channel, the seat anchor is coupled to the anchor-support pad, and signal flag is arranged to lie outside of the internal channel when the signal flag is moved to assume the first position.

6. The child restraint of claim 2, wherein the base includes a swivel-mount pad arranged to lie under the juvenile seat and coupled to the swivel and an anchor-support pad arranged to extend upwardly from the swivel-mount pad, the anchor-support pad includes a front wall formed to include an open window associated with the seat anchor and a top wall formed to include a flag aperture, the anchor-support pad is formed to include an internal channel interconnecting the open window and the flag aperture, the flag mover includes a flag lifter mounted for up-and-down movement in the internal channel and a lift tab coupled to the flag lifter to move therewith and arranged to extend outwardly through the open window and move up and down in the open window during up-and-down movement of the flag lifter in the internal channel, the signal flag is coupled to the flag lifter to move therewith, and the actuator means of the seat-back lock is arranged to apply a force to the lift tab to move the flag lifter and the signal flag relative to the anchor-support pad of the base during arrival of the juvenile seat at the forward-facing travel position.

7. The child restraint of claim 6, wherein the seat anchor includes an anchor bar that is arranged to lie in spaced-apart relation to the front wall to define a hook-receiving space therebetween, the lift tab is positioned to lie in the hook-receiving space upon movement of the signal flag to the first position, and the actuator means includes a hook configured to mate with the anchor bar upon movement of the juvenile seat to the forward-facing travel position and to provide means for raising the lift tab in the open window an upward direction to a raised position located between the anchor bar of the seat anchor and the top wall of the anchor-support pad to cause the signal flag to move from the first position to the second position.

8. The child restraint of claim 6, wherein the lift tab is arranged to lie above the seat anchor and below the top wall upon movement of the signal flag to the second position.

9. The child restraint of claim 6, wherein the seat anchor is located in a position between the lift tab and the top wall.

10. The child restraint of claim 6, wherein the seat anchor includes an anchor bar that is arranged to lie in spaced-apart relation to the front wall to define a hook-receiving spare therebetween and the actuator means includes a hook configured to mate with the anchor bar upon movement of the juvenile seat to the forward-facing travel position and to provide means for urging the lift tab in a downward direction away from the anchor bar and the top wall to cause the signal flag to move from the second position to the first position.

11. The child restraint of claim 1, wherein the swivel-status indicator includes a signal unit mounted for movement relative to the base and the seat-back lock includes a hook configured to provide means for mating with the seat anchor upon movement of the juvenile seat relative to the base to assume the forward-facing travel position to lock the juvenile seat to the base in the forward-facing travel position and means for moving the signal unit included in the swivel-status indicator relative to the base during mating of the hook and the seat anchor from a first position representing an unlocked condition of the juvenile seat wherein the juvenile seat is free to swivel relative to the base to a second position representing a locked condition of the juvenile seat wherein the juvenile seat is blocked form swiveling motion relative to the base.

12. The child restraint of claim 11, wherein the base is formed to include an internal channel and an open window, the open window is aligned with the seat anchor and arranged to open into the internal channel, the base further includes a wall formed to include a flag aperture opening into the internal channel, the signal unit includes a flag lifter arranged to extend through the open window to engage the hook as the hook moves relative to the base to mate with the seat anchor, the flag lifter is mounted for movement in the internal channel in response to a force applied by movement of the hook relative to the base and a signal flag, and the signal flag is coupled to the flag lifter for movement therewith and arranged to lie in the internal channel in response to movement of the signal unit to the first position and to lie outside of the internal channel in response to movement of the signal unit to the second position.

13. The child restraint of claim 12, wherein the signal flag is located in the internal channel upon movement of the signal unit to the first position.

14. The child restraint of claim 12, wherein the signal flag is located outside of the internal channel upon movement of the signal unit to the first position.

15. The child restraint of claim 11, wherein the hook of the seat-back lock is arranged to engage and move the signal unit from the first position to the second position during movement of the juvenile seat from the side-facing entry position in a clockwise direction to the forward-facing travel position and from another side-facing entry position in a counter-clockwise direction to the forward-facing travel position.

16. The child restraint of claim 11, wherein the hook includes an upstanding finger arranged to pass through a finger-receiving opening defined by the seat anchor to trap a center bar included in the seat anchor between the finger and the seat back to block further swiveling movement of the juvenile seat relative to the base and positioned to contact a lift tab included in the signal unit and raise the signal unit upwardly relative to the base to assume the second position.

17. The child restraint of claim 11, wherein the hook includes an upstanding finger arranged to pass through a finger-receiving opening defined by the seat anchor to trap a center bar included in the seat anchor between the finger and the seat back to block further swiveling movement of the juvenile seat relative to the base and positioned to contact a bolt included in the signal unit and lower the signal unit downwardly relative to the base to assume the second position.

18. A child restraint comprising
a seat support including a base adapted to set on a vehicle seat and formed to include an internal channel, a seat anchor coupled to the base, and a swivel coupled to the base,
a juvenile seat mounted on the swivel for swiveling motion relative to the base about an axis of rotation between a forward-facing travel position and a side-facing entry position, the juvenile seat including a seat bottom mounted on the swivel, a seat back arranged to extend upwardly away from the seat bottom, and a seat-back lock coupled to the seat back to move therewith during swiveling motion of the juvenile seat relative to the base and configured to mate with the seat anchor upon movement of the juvenile seat to assume the forward-facing travel position to block further swiveling motion of the juvenile seat, and
a swivel-status indicator including a signal unit mounted for movement in the internal channel relative to the base between a first position representing an unlocking swiveling condition of the juvenile seat wherein the juvenile seat is free to swivel relative to the base and a second position representing a locked non-swiveling condition of the juvenile seat wherein the juvenile seat is blocked from swiveling motion relative to the base, the swivel-status indicator further including spring means for yieldably urging the signal unit from the second position to the first position until the seat-back lock carried on the juvenile seat contacts the signal unit and moves the signal unit from the first position to the second position during swiveling motion of the juvenile seat from the side-facing entry position toward the forward-facing travel position and arrival of the juvenile seat at the forward-facing travel position.

19. The child restraint of claim 18, wherein the base includes a front wall and a top wall, the front wall is coupled to the seat anchor and formed to include an open window opening into the internal channel, the top wall is formed to include a flag aperture opening into the internal channel, the signal unit includes a signal flag and a flag lifter coupled to the signal flag, and the flag lifter includes a flag support coupled to the signal flag and mounted for back-and-forth movement in the internal channel and a lift tab coupled to the flag support and arranged to extend through the open window to mate with the seat-back lock during arrival of the juvenile seat at the forward-facing travel position.

20. The child restraint of claim 19, wherein the signal flag is located in the internal channel upon movement of the signal unit to the first position and outside the internal channel upon movement of the signal unit to the second position.

21. The child restraint of claim 19, wherein the signal flag is located outside of the internal channel upon movement of the signal unit to the first position and inside the internal channel upon movement of the signal unit to the second position.

22. The child restraint of claim 19, wherein the swivel-status indicator further includes a flag-viewing shell coupled to the top wall and configured to cover the flag aperture and define an interior region communicating with the interval channel via the flag aperture and receiving the signal flag upon movement of the signal unit to the second position.

23. The child restraint of claim 22, wherein the flag-viewing shell includes a frame mounted in a stationary position in the internal channel and a dome coupled to the frame and arranged to extend through the flag aperture and raise above the top wall of the base, the dome is formed to include the interior region receiving the signal flag upon movement of the signal unit to the second position, and the spring means is arranged to act between the frame and the flag support.

* * * * *